United States Patent
Wong et al.

(10) Patent No.: US 8,140,733 B2
(45) Date of Patent: Mar. 20, 2012

(54) SECURE EXTERNAL COMPUTER HUB

(75) Inventors: Michael Howard Wong, Nepean (CA); Bradley Clare Ritchie, Kemptville (CA)

(73) Assignee: Emcon Emanation Control Ltd., Ontario (CA)

( * ) Notice: Subject to any disclaimer, the term of this patent is extended or adjusted under 35 U.S.C. 154(b) by 29 days.

(21) Appl. No.: 12/855,025

(22) Filed: Aug. 12, 2010

(65) Prior Publication Data

US 2012/0042099 A1    Feb. 16, 2012

(51) Int. Cl.
*G06F 13/20* (2006.01)
*G06F 13/00* (2006.01)

(52) U.S. Cl. ............... 710/313; 710/8; 710/62

(58) Field of Classification Search ............ 710/8–14, 710/62–63, 305–306, 313
See application file for complete search history.

(56) References Cited

U.S. PATENT DOCUMENTS

| | | | | |
|---|---|---|---|---|
| 5,675,813 | A * | 10/1997 | Holmdahl | 713/310 |
| 7,818,673 | B2 * | 10/2010 | Cunningham et al. | 715/734 |
| 2005/0172062 | A1 * | 8/2005 | Adams | 710/305 |
| 2006/0224897 | A1 * | 10/2006 | Kikuchi et al. | 713/182 |
| 2007/0079045 | A1 * | 4/2007 | Luke | 710/313 |
| 2007/0255869 | A1 * | 11/2007 | Walters et al. | 710/62 |
| 2008/0034092 | A1 * | 2/2008 | Kikuchi et al. | 709/225 |
| 2008/0040796 | A1 * | 2/2008 | Takasu | 726/18 |
| 2009/0049307 | A1 | 2/2009 | Lin | |
| 2010/0262726 | A1 * | 10/2010 | Tauscher et al. | 710/16 |

* cited by examiner

*Primary Examiner* — Christopher B Shin

(74) *Attorney, Agent, or Firm* — RatnerPrestia

(57) ABSTRACT

Secure external hubs for coupling peripheral devices to host computers are disclosed. Each peripheral device includes device identification (ID). Peripheral devices may be securely coupled to a host computer by designating authorized device IDs in response to an administrator input received via an administrator port of a hub, authorizing the peripheral devices connected to the hub based on the designated authorized device IDs, and enabling communication between authorized peripheral devices connected to the hub and a communication cable and preventing communication between unauthorized peripheral devices connected to the hub and the communication cable.

20 Claims, 7 Drawing Sheets

SECURE EXTERNAL COMPUTER HUB

FIELD OF THE INVENTION

The present invention relates to the field of electronics and, more particularly, to external computer hubs and methods for configuring same.

BACKGROUND OF THE INVENTION

The universal serial bus (USB) facilitates connections between a host computer and USB devices such as a keyboard, mouse, and printer. Entities concerned that data security may be compromised by its accessibility via the USB bus often face an "all or nothing" decision, e.g., enabling/disabling the USB ports within the basic input/output system for computers (BIOS).

SUMMARY OF THE INVENTION

The present invention is embodied in apparatus, methods, and systems for secure communication between peripheral devices and one or more hosts.

An apparatus in accordance with the present invention includes a secure external hub for coupling a plurality of peripheral devices to a host computer. Each peripheral device includes device identification (ID). The hub includes a communication cable for connection with the host computer, a first connection port for connection with a first peripheral device including first device ID, a first communication path extending between the first connection port and the communication cable, a first switch coupled within the first communication path, an administrator input device, a memory for storing at least one authorized device ID, and a processor coupled to the first switch, the administrator input device, and the memory, the processor programmed to designate the at least one authorized device ID in response to an administrator input received via the administrator input device, to receive the first device ID when the first peripheral device is connected to the first connection port, to identify a match between the first device ID and the at least one stored authorized device ID, and to selectively actuate the first switch such that communication is enabled through the first communication path when a match is identified and communication is disabled when a match is not identified.

Methods and systems in accordance with the present invention include methods and systems for configuring a secure external hub for coupling a plurality of peripheral devices to a host computer. Each peripheral device includes device identification (ID). Secure communication is established by designating at least one authorized device ID in response to an administrator input received via an administrator port of the hub, authorizing one or more peripheral devices connected to the hub based on the designated at least one authorized device ID, and enabling communication between authorized peripheral devices connected to the hub and a communication cable of the hub for communication with the host computer and preventing communication between unauthorized peripheral devices connected to the hub and the communication cable.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Also, lines without arrows connecting components may represent a bi-directional exchange between these components. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

Figure 1:
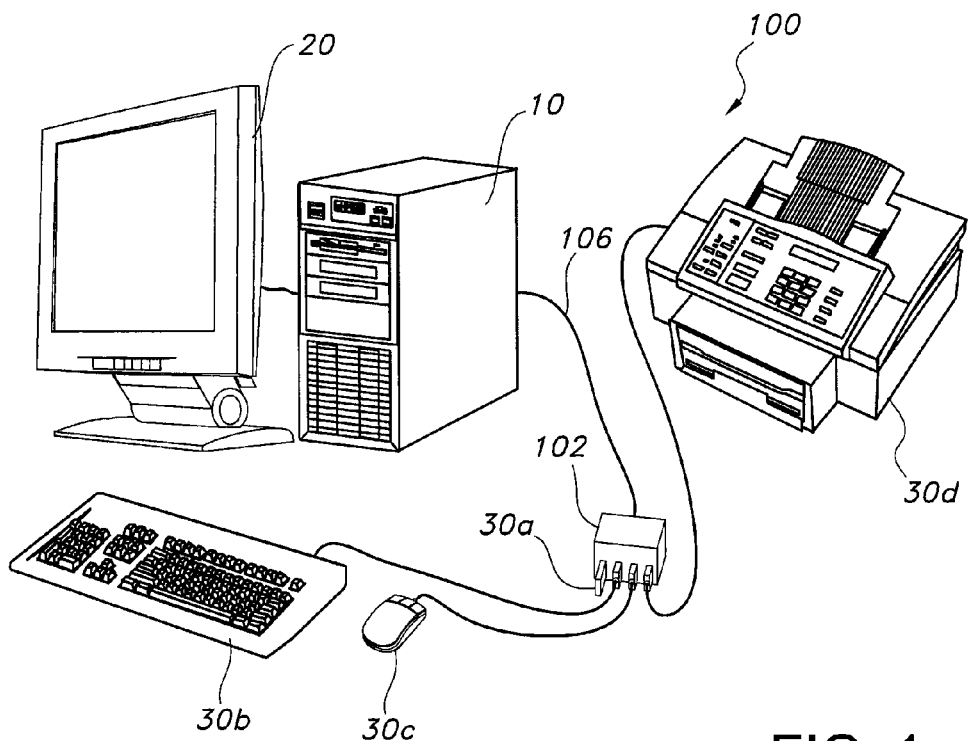
FIG. 1 is an illustrative front view of a computer system including a host computer and a secure hub in accordance with one aspect of the present invention.

FIG. 1 depicts a computer system 100 including a secure hub 102 for coupling a plurality of peripheral devices 30 to a host computer 10 in accordance with an aspect of the present invention. The depicted computer system 100 includes a host computer 10, a monitor 20, and three devices (i.e., a storage drive 30a, keyboard 30b, mouse 30c, and printer 30d). The peripheral devices 30 are coupled to the host computer 10 via the secure hub 102, which is coupled to the host computer 10 via a communication cable 106. The communication cable 106 may be hard wired to circuitry within the secure hub 102 to prevent its removal from the secure hub 102. Host computer 10 and peripheral devices 30 may be conventional electronic devices capable of communication in accordance with a USB communication specification. Suitable computers and peripheral devices will be understood by one of skill in the art from the description herein.

Figure 1A:
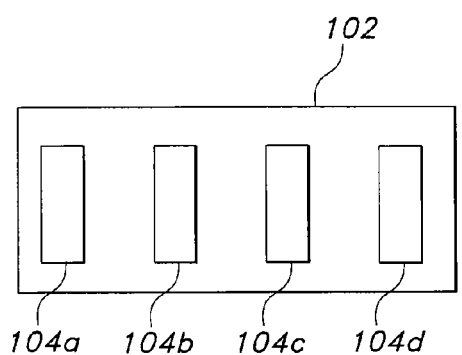
FIG. 1A is a block diagram illustrating a front view of the secure hub of FIG. 1.

FIG. 1A depicts a front face of the secure hub 102. The illustrated secure hub 102 includes four ports (ports 104a-d) for establishing a connection with peripheral devices 30 (FIG. 1). For example, port 104a may be connected to storage device 30a, port 104b may be connected to keyboard 30b, port 104c may be connected to mouse 30c, and port 104d may be connected to printer 30d. In an exemplary embodiment, the ports 104 are USB "Type A" receptacles configured to receive USB "Type A" plugs associated with the peripheral devices 30. Each peripheral device 30 includes information that may be used to identify a particular device or group of devices. The information may include Vendor ID, Product ID, Product Class, and serial number among others. Peripheral devices that comply with the USB specification are required to include such information and, thus, the secure hub 102 is particularly well suited to use with USB peripheral devices. Particular information for identifying authorized devices or groups of devices based on one or more pieces of the stored information is referred to herein as the device ID.

Figure 1B:
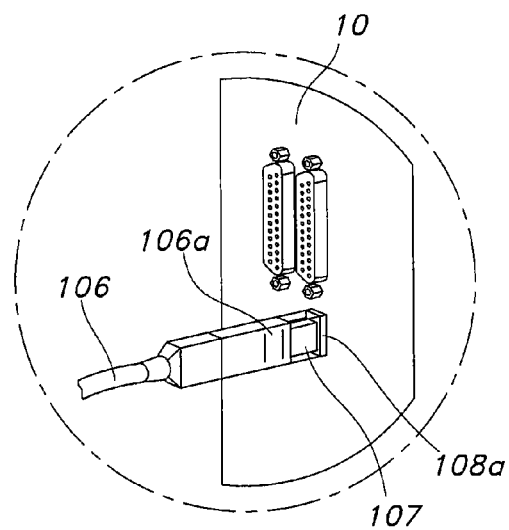
FIG. 1B is an illustrative partial view of a back surface of the host computer in FIG. 1.

FIG. 1B depicts a portion of a back surface of host computer 10. The host computer 10 depicted in FIG. 1B includes a connection port 108a. The secure hub 102 (FIG. 1) is connected to the connection port 108a via a connector 106a on an end of the communication cable 106. In an exemplary embodiment, the connector 106a is a USB "Type A" plug and the connection port 108a is a USB "Type A" receptacle configured to receive the USB "Type A" plug. In an exemplary embodiment, the connector 106a is physically secured to the connection port 108a of the host computer using a tamper resistance connection 107. The tamper resistant connection 107 is configured to prevent removal of the connector 106a from the connection port 108a by unauthorized users and/or provide an indication of removal. Suitable tamper resistant connections will be understood by one of skill in the art from the description herein.

Figure 2A:
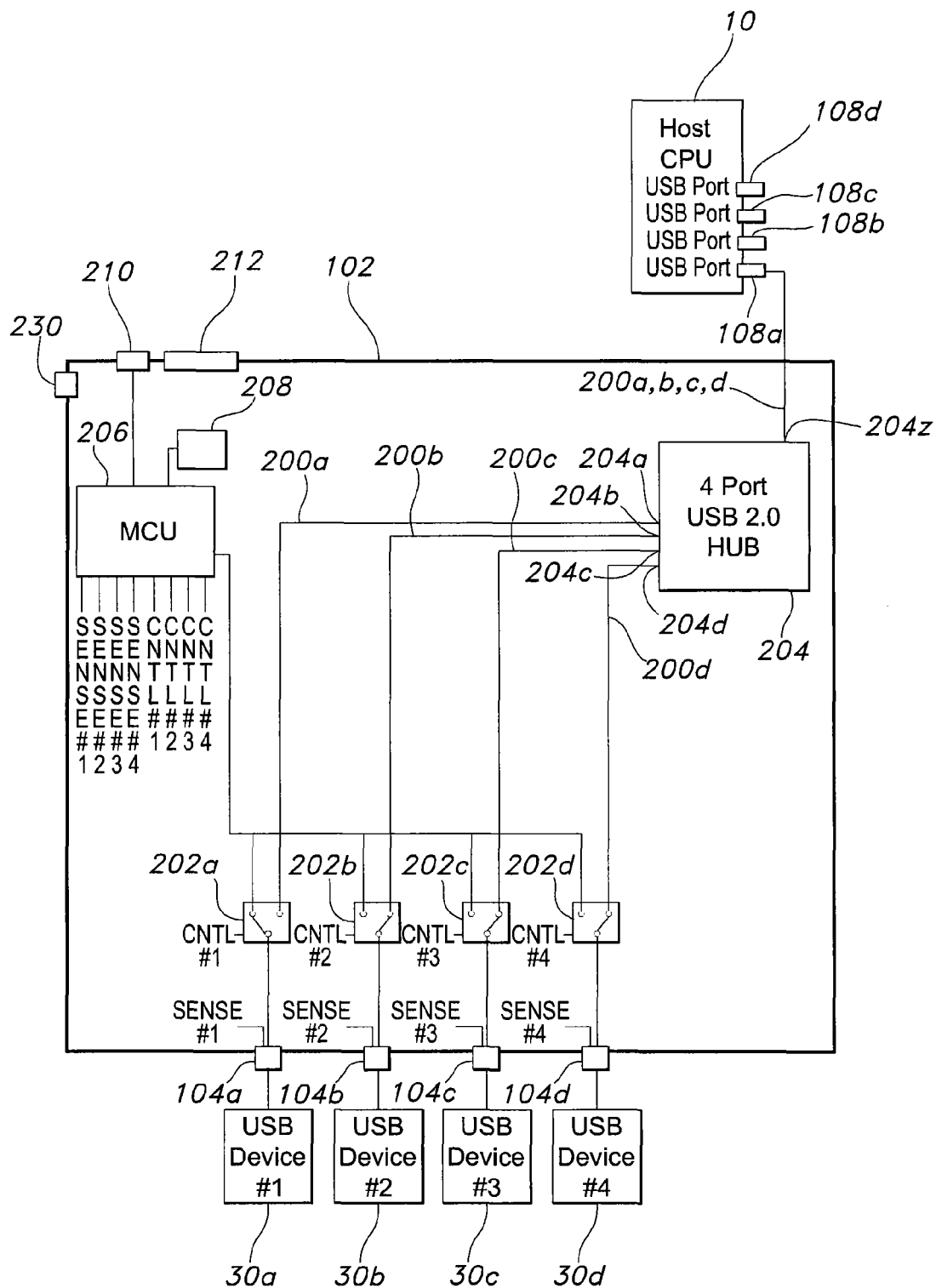
FIG. 2A is a block diagram in partial circuit diagram form depicting the secure hub connected to peripheral devices and a host computer in accordance with aspects of the present invention.

FIG. 2A depicts exemplary internal circuitry of a secure hub 102 connected to peripheral devices 30 and to a host computer 10. The host computer 10 illustrated in FIG. 2A includes 4 ports 108a-d, however, three of the ports 108b-d are blocked, e.g., physically or electronically. Suitable techniques for blocking the ports will be understood by one of skill in the art from the description herein. Thus, as a practical matter, the host computer 108 has a single connection port 108a for communication over a bus, which prevents bypassing the secure hub 102. Additionally, as described above, the USB communication cable 106 may be coupled to the host computer 10 using a tamper resistant connection 107, which prevents bypassing the secure hub 102 by disconnecting communication cable 106 from the single connection port 108a.

Four communication paths 200a-d extend through the illustrated secure hub 102, however, essentially any number of paths 200 may be integrated into the hub 102. In the illustrated embodiment, each path 200 passes through a switch 202 and a USB hub module 204. Additionally, each path includes a unique portion extending from downstream ports 204a-d of USB hub module 204 and a portion shared with the other paths extending from an upstream portion 204z of USB hub module 204. For example, a first path 200a extends from a first connection port 104a through a first switch 202a to a first downstream port 204a of the USB hub module 204. The first path 200a then shares the same path within the communication cable 106; with the USB hub module 204 routing communications between the shared portions and the unique portions of each path 200. Likewise, a second path 200b extends from a second connection port 104b through a second switch 202b to a second downstream port 204b of the USB hub module 204. The second path 200b then shares the same path within the communication cable 106 as the first path 200a. Suitable USB hub modules and switches will be understood by one of skill in the art from the description herein.

In an exemplary embodiment, each switch 202 includes two switches in series (not shown). A first switch allows a respective connection port 104 to be connected to either the USB hub module 204 or to a second switch. The second switch allows the respective connection port 104 to be connected to respective monitoring pins of the processor 206 (e.g., a general purpose input/output pins) or to pins of the processor 206 through which full USB enumeration protocol may be performed (the "enumeration port"). The second switches provide a means for selecting one port 104 at a time for enumeration so that there is no collision at the enumeration port. This enables use of a processor 206 having a single port through which USB enumeration may be performed. In an alternative embodiment, a processor 206 may be employed having multiple ports through which enumeration may be performed. In accordance with this embodiment, a single switch may be used for each switch 202 that allows the respective connection port 104 to be connected to either the USB hub module 204 or to a respective enumeration port. It is to be understood that the peripheral devices 30 are not connected together when two or more of the switches 202 connect the peripheral devices 30 to the processor 206.

A processor 206 selectively enables/disables the communication paths 200a-d to enable communication between "authorized" peripheral devices 30 and the host computer 10 and disabling/preventing communication between "unauthorized" peripheral devices 30 and the host computer 10. In an exemplary embodiment, the processor 206 actuates the switches 202 within the respective communication paths 200 to enable/disable communication. The processor 206 may send a device reset command to the peripheral devices 30 prior to actuating the switches 202. In the illustrated embodiment, switches 202b-d are configured to enable communication along respective communication paths 200b-d and switch 202a is configured to disable communication along respective communication path 200a. Thus, keyboard 30b, mouse 30c, and printer 30d are able to communicate with the host computer 10 while storage device 30a is prevented from communicating with the host computer.

The illustrated processor 206 includes a respective control line (CNTL #1-4) for each switch 202 and a respective sense line (SENSE #1-4) for each connection port 104. Additionally, the processor 206 has access to a memory 208 for storing information into and retrieving information from. The processor 206 is able to sense when a peripheral device 30 is connected to a particular connection port 104 via the sense lines. In addition, the processor 206 is able to independently control each of the switches 202 via the control lines. Current sense circuits (not shown) may sense insertion/removal of peripheral devices at the connection ports 104. The current sense circuits may be coupled to processor 206 via the sense lines to enable the processor 206 to sense insertion/removal of peripheral devices 30 at the connection ports 104. Alternatively, capacitive sense capabilities built into the processor 206 may be employed to sense insertion/removal of peripheral devices 30 at the connection ports 104 via the sense lines. Suitable sense circuits and processors for use with the present invention will be understood by one of skill in the art from the description herein.

The processor 206 also has a connection to one or more administrator input devices such as an administrator port 210, an administrator key port 212, and/or a registration button 230. The administrator port 210 may be an RJ45 connector and the administrator key port 212 may be a "Type A" USB receptacle configured to receive the USB "Type A" plug of a USB storage device including a secure key code ("secure key") that may be used for authorization/authentication. In an exemplary embodiment, the secure key must be inserted in the administrator key port 212 to enable communication with the processor 206 via the administrator port 210. The processor 206 may be configured to detect when the registration button 230 is depressed/actuated.

In an exemplary embodiment, the processor 206 may designate authorized device ID information in response to an administrator input signal (administrator input) received via an administrator input device (such the administrator port 210, the administrator key port 212, and/or the registration button 230) directing authorization of a particular peripheral device 30 or group of peripheral devices 30, which the processor 206 may then, in turn, store in memory 208. Thereafter, the processor 206 will enable communication for peripheral devices 30 associated with the stored authorized device IDs In one embodiment, the administrator input includes authorized device IDs that are stored in a remote computer and/or secure key. The authorized device IDs are then transferred (e.g., via the administrator port 210 and/or the administrator key port 212) to the processor 206, which stores the received IDs as authorized device IDs. In accordance with this embodiment, the authorized device IDs are designated because they are received in the administrator input.

In another embodiment, device IDs are received from connected peripheral devices 30 and an administrator input (e.g., a signal received via administrator port 210 from a remote computer or a signal generated by actuation of registration button 230 when a secure key is present in administrator key port 212) is received by processor 206 while the peripheral devices 30 are connected to the secure hub 102. In response to the administrator input, the processor 206 designates the device IDs supplied by the connected peripheral devices 30 as authorized device IDs. In accordance with this embodiment, the device IDs are designated as authorized device IDs because the device IDs are received from peripheral devices 30 that are connected to the secure hub 102 when the administrator input signal is received. In one embodiment, device IDs may be received by the processor 206 from connected peripheral devices 30 and a qualification selection may be received via the administrator port 210 selecting one or more of the vendor ID, product ID, or serial number along with corresponding values as required matches for authorization.

Qualification and authorization information (e.g., authorized device ID) may be solicited from an administrator via a graphical user interface (GUI), which may be used to configure the secure hub 102 and is described in further detail below. The GUI may be a web based GUI stored as administrator data in the memory 208. The processor 206 may retrieve the GUI from memory 208 and serve it to a remote host computer via the administrator port 210. In another example, when a secure key is inserted into the administrator key port 212, peripheral devices 30 are connected to the ports 104, and the registration button 230 is actuated, the processor 206 stores device IDs retrieved from each of the connected devices 30 in memory as authorized device IDs.

The processor 206 may be programmed to designate an authorized device ID in response to an administrator input received via the administrator input device, to receive a first device ID when a first device is connected to a first USB connection port, to identify a match between the first device ID and the designated authorized device ID, and to selectively actuate the first switch such that communication is enabled through the first communication path when a match is identified and communication is disabled when a match is not identified. The processor may further be programmed to receive a second device ID when a second device is connected to the second connection port, to identify a match between the second device ID and the designated authorized device ID, and to selectively actuate the second switch such that communication is enabled through the second communication path when a match is identified and communication is disabled when a match is not identified.

Figure 2B:
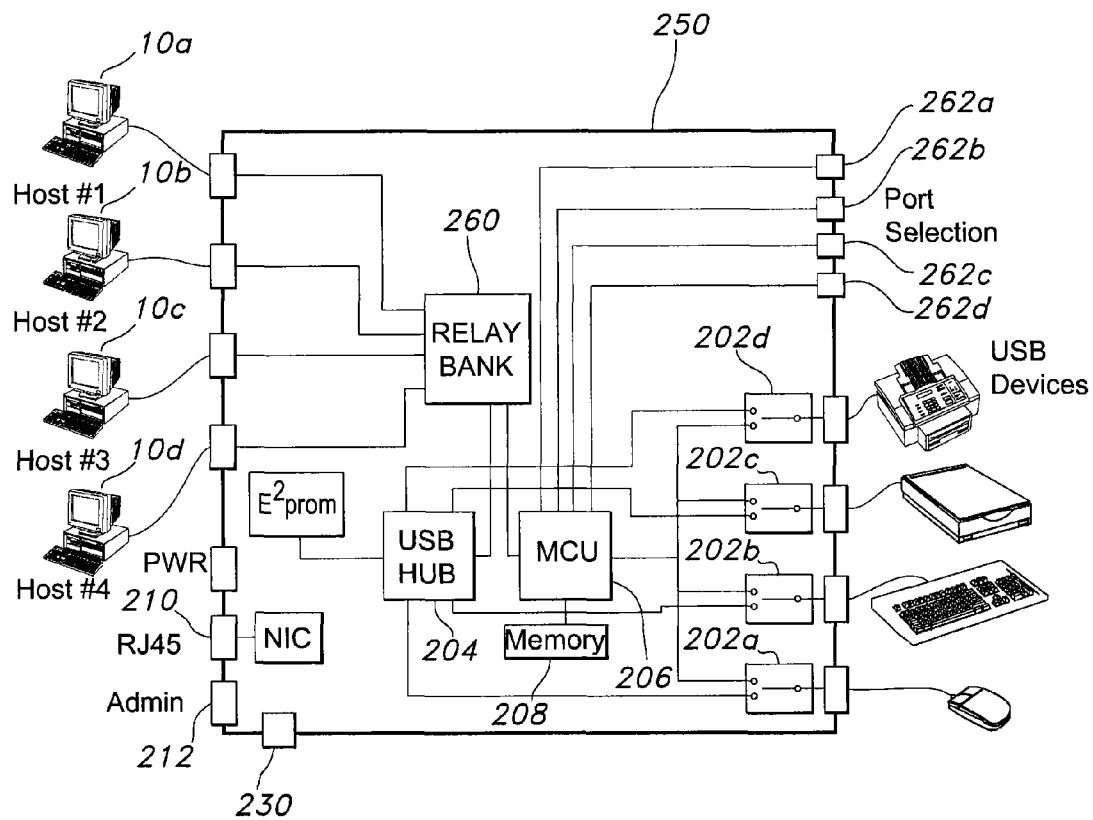
FIG. 2B is a block diagram in partial circuit diagram form depicting a secure hub implemented in a keyboard, video, mouse (KVM) switch in accordance with aspects of the present invention.

FIG. 2B depicts a secure hub implemented in a keyboard, video, and mouse (KVM) switch 250 in accordance with aspects of the present invention. Switch 250 adds a relay bank 260 controlled by processor 206 to the components of secure hub 102 (FIG. 2A) described above. Relay bank 260 is positioned between USB hub 204 and a plurality of host computers 10 to enable communication between the peripheral devices 30 and the plurality of host computers 10.

Port selectors 262 coupled to processor 206 direct selection of host computers 10 for communication with peripheral devices 30. For example, an input signal received via a first port selector 262a results in processor 206 configuring relay bank 260 to establish communication between the first host computer 10a and the peripheral devices 30 via USB hub 204. In addition, processor 206 may establish and store unique authorized device IDs for each host computer 10 (e.g., along with port selection information). Thus, in the illustrated embodiment, a user is able to switch between four (4) host computers 10, where each host computer 10 may have a different configuration of peripheral services. For example, a "secure" host computer 10 may not allow a memory stick as a peripheral device, but a "non-secure" host computer 10 could communicated with any peripheral device.

Figure 3:
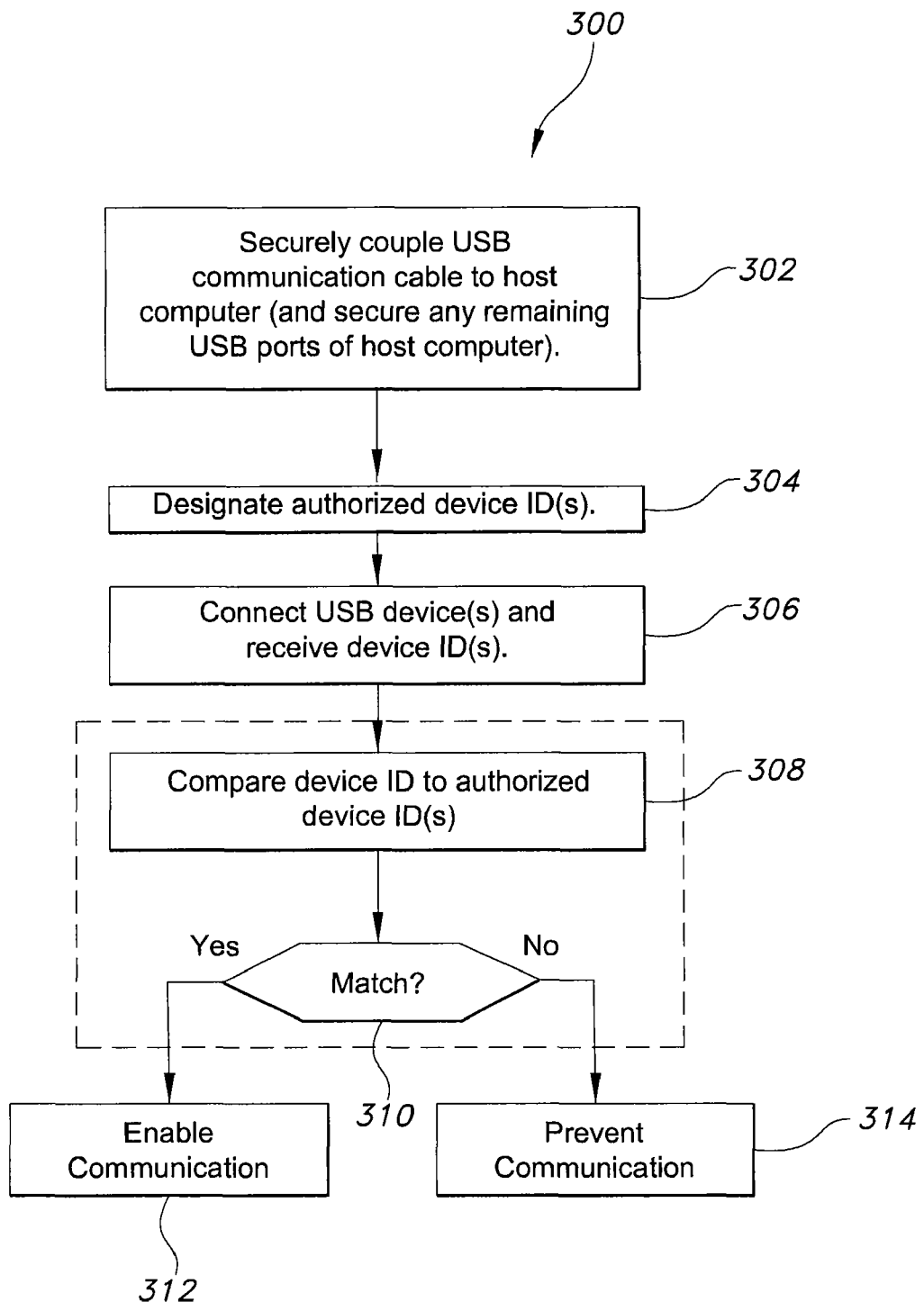
FIG. 3 is a flow chart of exemplary steps for steps for configuring a secure hub in accordance with an aspect of the present invention.

FIG. 3 depict a flow chart 300 of exemplary steps for configuring a secure external hub for coupling a plurality of peripheral devices to a host computer. To facilitate description, the present invention will be described with reference to FIGS. 1 and 2. The present invention, however, is not limited to such an implementation.

At block 302, a communication cable of a secure hub is securely coupled to a host computer. In an exemplary embodiment, the communication cable 106 of the secure hub 102 is coupled to a first port 108a of the host computer 10 using a tamper resistant connection 107. Additionally, the remaining ports of the host computer 10 (e.g., ports 108b-d) may be secured/blocked (either physically or electronically) to prevent bypassing the secure hub 102 by disconnecting communication cable 106 from the connection port 108a and coupling the communication cable 106 to another port.

At block 304, one or more authorized device IDs are designated at the secure hub. In an exemplary embodiment, at least one authorized device ID is designated based on input received via an administrator input (e.g., received via port 210, via key port 212, or from registration button 230) of the secure hub 102.

The authorized device IDs may be one or more pieces of information typically stored in a USB device and transmitted when the USB device is connected to a USB hub/host. This information may include Vendor ID, Product ID, Product Class, and serial number among others. In an exemplary embodiment, the administrator may specify which information will serve as the authorized device ID that must be matched in order to be an "authorized" device. For example, the administrator may qualify that Vendor ID, Product ID, Product Class, and serial number must all match, which would allow only a particular device to be authorized for that authorized device ID. The administrator may also qualify that only a Product Class must match (e.g., Class 03h—Human Interface Device or "HID") and, thus, all devices such as a keyboard, a mouse, or a joystick would be authorized for that authorized device ID, but not a mass storage device (Class 08h). One or more authorized device IDs may be associated with the secure hub 102. In a preferred embodiment, the authorized device IDs are associated with the hub and, thus, an authorized device ID will enable a corresponding peripheral device to be used on any port of the hub. In an alternative embodiment, the authorized device IDs may be associated with a particular port of the hub and, thus, an authorized device ID may only enable a corresponding peripheral device to be used on the port with which the authorized device ID is associated.

In one embodiment, the processor 206 may designate authorized device IDs by receiving the authorized device IDs via the administrator port 210 (e.g., from a remote computer) and storing the authorized device IDs in memory 208. In another embodiment, the processor 206 may designate authorized device IDs by receiving the authorized device IDs via the administrator key port 212 (e.g., from a secure electronic key). In another embodiment, the processor 206 may designate authorized device IDs by receiving the device IDs from devices connected to the secure hub 102, receiving an input signal via the administrator port 210 (e.g., from a remote computer) approving authorization of the received device IDs for the connected devices, and storing the approved device IDs as authorized device IDs in memory 208. In another embodiment, the processor 206 may designate authorized device IDs by receiving the device IDs from devices connected to the secure hub 102, receiving an input signal via the registration button 230 approving authorization of the received device IDs for the connected devices, and storing the approved device IDs as authorized device IDs in memory 208. In accordance with this embodiment, a rule (e.g., used to configure processor 206) may be created for HID peripheral devices based on, for example, the Class, Subclass and Protocol of the peripheral device. For example, if a keyboard is attached, a rule may be created allowing all keyboards to connect). Another rule may be created for each non-HID type device based on the Vendor ID, the Product ID and the serial number of the device, allowing just this specific device to connect.

In an exemplary embodiment, one or more authorized device IDs are designated based on input received via one or more GUIs (described in further detail below with respect to FIGS. 4-8). The GUIs may be stored as administrator information in memory 208 and served by the processor 206 to a remote computer (not shown) via the administrator port 210 when the remote computer is coupled to the administrator port 210 (e.g., via an RJ45 connector). The processor 206 may further require that a secure key is connected to the administrator key port 212 for verification by the processor 206 prior to serving the GUIs and receiving authorized device IDs.

At block 306, peripheral device(s) are connected to the secure hub and device ID(s) are received from the USB device(s). One or more peripheral devices 30 may be connected to connection ports 104 of secure hub 102 and the processor 206 retrieves device IDs from the connected devices.

The processor 206 may be configured to mimic a USB hub/host. When a device 30 is coupled to a port 104, the processor 206 senses the connection via the sense lines (SENSE #1-4). The processor may then configure the respective switch 202 associated with the connection port 104 to which the USB device 20 is coupled, via a respective control line (CNTL #1-4), for communication with the device 30. Behaving as a USB hub/host, the processor 206 initiates an enumeration process in accordance with the USB standard that results in the USB device transmitting information that includes, inter alia, Vendor ID, Product ID, Product Class, and serial number. One or more pieces of this information becomes the device ID information for matching purposes described below.

At blocks 308 and 310, one or more peripheral devices connected to the secure hub are authorized based on the authorized device ID(s) designated at block 304. At block 308, device ID(s) retrieved at block 306 for connected device(s) are compared to authorized device ID(s) designated at block 304. Processor 206 may compare device IDs received from connected devices 30 to authorized device IDs stored in memory 208. At block 310, a decision is made, e.g., by processor 206, regarding whether the compared device ID of each peripheral device and the authorized device ID(s) match. It there is a match, the peripheral device 30 is authorized and processing proceeds at block 312. If there is not a match, the peripheral device 30 is not authorized.

At block 312, which is reached if a match is identified at block 310, communication is enabled through secure hub 102. In an exemplary embodiment, processor 206 selectively actuates switches 202 to enable communication along paths 200 through secure hub 102 for authorized peripheral devices 30. Processor 206 may selectively actuate switches 202 via control lines (CNTL #1-4). For example, if peripheral device 30b is an authorized device, processor 206 may actuate switch 202b via control line CNTL #2 to enable communication along respective communication path 200b. Likewise, if peripheral devices 30c, d are authorized devices, processor 206 may actuate switches 202c, d via control lines CNTL #2, 3 to enable communication along respective communication paths 200c, d.

At block 314, which is reached if a match is not identified at block 310, communication is prevented/not enabled through secure hub 102. In an exemplary embodiment, processor 206 selectively actuates switches 202 to prevent communication along paths 200 through secure hub 102 for peripheral devices 30 that are not authorized. Processor 206 may selectively actuate switches 202 via control lines (CNTL #1-4). For example, if peripheral device 30a is not an authorized device, processor 206 may actuate switch 202a via control line CNTL #1 to prevent communication along path 200a.

It is to be understood that the steps of flow chart 300 may be carried out in an order other than presented above. For example, peripheral devices 30 may be connected at block 306 prior to receiving authorized device ID(s) at block 304. Additionally, the steps may be repeatedly carried out sequentially for each of a plurality of peripheral devices 30 or may be carried out for two or more USB devices at a time.

FIGS. 4-8 illustrate exemplary GUIs for configuring a secure hub such as secure hub 102 in accordance with aspects of the present invention. The illustrated GUIs set forth options and settings available for configuring the secure hub 102 to enable/prevent communication along communication paths 200 within hub 102.

Figure 4:
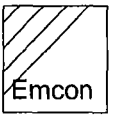
FIG. 4 is a graphical user interface of a port status screen in accordance with an aspect of the present invention.

FIG. 4 depicts an exemplary normal port status screen 400 for the secure hub 102. The operation screen includes a menu on the far left that provides selection keys for selecting other GUIs for display (USB Port Status, Device Registration, Hub Administration, Network Configuration, Audit Reports, Set Date/Time, System Info, Firmware Updates). In the illustrated embodiment this selection menu is common to all GUIs although it is contemplated that it may be different for one or more GUIs.

Normal port status screen 400 depicts operation of a configured secure hub 102. Screen 400 provides the status of each port 104 (FIG. 2A). Screen 400 depicts that peripheral USB devices are connected to three of the ports 104a-c and one of the ports is empty, that two of these peripheral devices have been determined to be approved device, that one of these peripheral devices has been determined to not be approved, and that one of the ports 104d is empty. Additionally, screen 400 include information, including device ID information, for each peripheral device 30 connected to a port. For example, screen 400 identifies that the peripheral device connected to the first port 104a is a USB optical mouse and that the USB optical mouse is an approved device. Thus, the connection path 200a extending from the first port 104a would be enabled by the processor 206. The peripheral device connected to the third port 104c, on the other hand, is identified as a storage device that is not authorized. Thus, the connection path 200c extending from the third port 104c would be disabled by the processor 206.

FIGS. 5-8 depict exemplary administration operation screens 500, 600, 700, and 800 for configuring/reconfiguring a secure hub 102. The administration operation screens may be used to edit configuration settings, load new configuration files and upgrade the system firmware.

Figure 5:
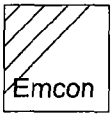
FIG. 5 is a graphical user interface of an administrator port status screen in accordance with an aspect of the present invention.
Figure 6:
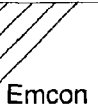
FIG. 6 is a graphical user interface of a registered device screen in accordance with an aspect of the present invention.

FIG. 5 depicts an administrator port status screen 500. The administrator port status screen 500 is similar to screen 400 with the exception that is allows an administrator to authorize/approve unauthorized device. For example, an administrator is able to authorize an unauthorized device such as the storage device connected to the third port 104c by selecting "Allow this category," "Allow this product," or "Allow this device." Selections may be made in a conventional matter, e.g., by positioning an indicator over the phrase with a mouse and depressing a selection button on the mouse. Selecting "Allow this device" would result in the devices serial number being an authorized ID and, thus, only that device would match that authorized ID. Selecting "Allow this category" would result in the class of product being an authorized ID and, thus, all storage devices would be allowed. Thus, an administrator can quickly and easily allow all low security risk device such as keyboards and selectively allow higher security risk devices such as USB storage devices.

is FIG. 6 depicts a registered device screen 600. The illustrated registered device screen 600 includes a "Clear List" selection button that allows an administration to remove all authorized device IDs from the secure hub 102. Screen 600 also includes check boxes for selecting particular peripheral devices that are currently approved and a "Remove Selected Devices" selection button for removing authorized device IDs associated with peripheral devices that are checked to allow an administrator to selectively remove authorized device IDs from the secure hub 102.

Figure 7:
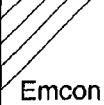
FIG. 7 is a graphical user interface of a device policy screen in accordance with an aspect of the present invention.

FIG. 7 depicts a device policy screen 700. The illustrated device policy screen 700 includes an "Edit Setting" selection button that allows an administrator to specify whether the secure hub 102 can be accessed with/without an administrator key 212 and whether authorized device IDs and/or network settings should be loaded automatically from the administrator key 212.

Figure 8:
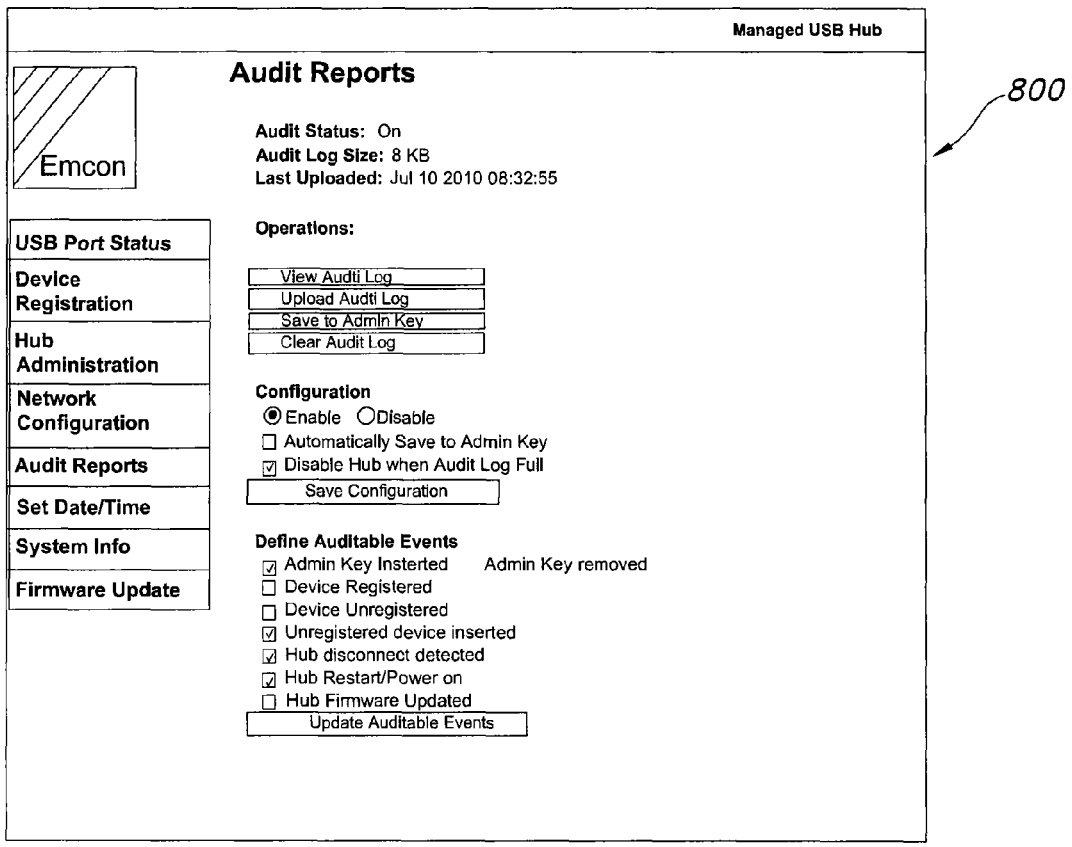
FIG. 8 is a graphical user interface of an audit report screen in accordance with an aspect of the present invention.

FIG. 8 depicts an audit report screen 800. In an exemplary embodiment, processor 206 identifies and records, e.g., in memory 208, identification information for administrator defined events along with time stamps. Check boxes are provided to allow an administrator to select events that will be recorded in the audit log. These events include insertion of administrator key 212, removal of administrator key 212, each device registration including device ID information, each device unregistered, the insertion of an unregistered device including device ID information, disconnection of secure hub 102 from the host computer 102, restart/power on of secure hub 102, and firmware updates. Additionally, selection boxes are provided to enable/disable the audit log and check boxes are provided to automatically save audit information to the administrator key 212 and to disable the secure hub 102 when the audit log is full.

The illustrated audit support screen 800 includes a "View Audit Log" selection button to present a report of all stored device connection information when selected (e.g., in another GUI on the remote computer), a "Upload Audit Log" selection button to send a file including all stored connection information to a specified location (e.g., remote computer hard drive), a "Save to Admin Key" selection button to send a file including all stored connection information to a the administrator key 212, and a "Clear Audit Log" selection button to clear audit log information from memory 208.

The present invention may be used in commercial applications as well as environments requiring TEMPEST equipment. TEMPEST is an official acronym for "Telecommunications Electronics Material Protected From Emanating Spurious Transmissions." In a commercial environment, a hub in accordance with the present invention may sit as a standalone unit much like a standard hub and be connected as illustrated in FIG. 1. When used in a TEMPEST configuration, the hub may look and feel much the same as a commercial unit with the exception of the input/output connections. An alternative solution for the hub in a TEMPEST environment is to integrate the hub into the "Level I" chassis. For example, the components of the secure hub 102 described above may be integrated into a Level I chassis with the administrator port 210 and the connection ports 104 available on a rear input/output (I/O) panel of the chassis.

Although the invention is illustrated and described herein with reference to specific embodiments, the invention is not intended to be limited to the details shown. Rather, various modifications may be made in the details within the scope and range of equivalents of the claims and without departing from the invention. For example, although the invention is described above with respect to a USB hub and USB devices, it is contemplated that the present invention may be applicable to other serial bus communication systems.

What is claimed:

1. A secure external hub for coupling a plurality of peripheral devices to a host computer, each peripheral device including device identification (ID), the hub comprising:
   a communication cable for connection with the host computer;
   a first connection port for connection with a first peripheral device including first device ID;
   a first communication path extending between the first connection port and the communication cable;
   a first switch coupled within the first communication path;
   an administrator input device;
   a memory for storing at least one authorized device ID; and
   a processor coupled to the first switch, the administrator input device, and the memory, the processor programmed to designate the at least one authorized device ID in response to an administrator input received via the administrator input device, to receive the first device ID when the first peripheral device is connected to the first connection port, to identify a match between the first device ID and the at least one stored authorized device ID, and to selectively actuate the first switch such that communication is enabled through the first communication path when a match is identified and communication is disabled when a match is not identified.

2. The hub of claim 1, further comprising:
   a second connection port for connection with a second peripheral device including second device ID;
   a second communication path extending between the second connection port and the communication cable; and
   a second switch coupled within the second communication path; and wherein the processor is further coupled to the second switch, the processor further programmed to receive the second device ID when the second peripheral device is connected to the second connection port, to identify a match between the second device ID and the at least one stored authorized device ID, and to selectively actuate the second switch such that communication is enabled through the second communication path when a match is identified and communication is disabled when a match is not identified.

3. The hub of claim 1, further comprising an administrator key port and wherein the processor is further programmed to only accept the administrator input from the administrator input device when a secure key is connected to the administrator key port.

4. The hub of claim 1, wherein the first device ID is at least one of vendor ID, product ID, or serial number.

5. The hub of claim 4, the processor further programmed to receive a qualification selection via the administrator input device selecting one or more of the vendor ID, product ID, or serial number, storing the qualification selection in memory, and basing identification of matches on the qualification selection.

6. The hub of claim 1, further comprising:
a USB hub module positioned within the first communication path, the USB hub module including an upstream port coupled to the communication cable and a downstream port coupled to the first connection port via the first switch.

7. The hub of claim 2, further comprising:
a USB hub module positioned within the first and second communication paths, the USB hub module including an upstream port coupled to the communication cable, a first downstream port coupled to the first connection port via the first switch, and a second downstream port coupled to the second connection port via the second switch.

8. The hub of claim 1, further comprising
a secure connector coupled to an end of the communication cable for establishing a tamper resistant connection with the host computer.

9. The hub of claim 1, wherein the memory includes administrator data for presenting a graphical user interface (GUI) on a remote computer terminal for soliciting the administrator input; and
wherein the processor is further programmed to retrieve the administrator data from memory and send it to the remote computer terminal via the administrator port.

10. The hub of claim 1, wherein the administrator input device includes an administrator key port and an administrator button and wherein the processor is programmed to designate device IDs received from the connected peripheral devices as the at least one authorized device ID when a secure key is received by the administrator key port and the administrator button is actuated.

11. A method for configuring a secure external hub for coupling a plurality of peripheral devices to a host computer, each peripheral device including device identification (ID), the method comprising:
designating at least one authorized device ID in response to an administrator input received via an administrator input device of the hub;
authorizing one or more peripheral devices connected to the hub based on the designated at least one authorized device ID; and
enabling communication between authorized peripheral devices connected to the hub and a communication cable of the hub for communication with the host computer and preventing communication between unauthorized peripheral devices connected to the hub and the communication cable.

12. The method of claim 11, further comprising the step of:
securely coupling the communication cable to a first port of the host computer.

13. The method of claim 12, the method further comprising the step of:
securing a second port of the host computer.

14. The method of claim 11, wherein the designating step comprises:
sending, via the administrator port, administrator data for presenting a graphical user interface (GUI) on a remote computer terminal, the GUI soliciting the administrator input; and
receiving the administrator input into the GUI.

15. The method of claim 14, the designating step further comprising:
receiving a secure key via an administrator key port; and
verifying the received secure key prior to sending the administrator data.

16. The method of claim 11, wherein the designating step comprises:
receiving device ID from each of the peripheral devices connected to the hub;
receiving the administrator input; and
designated the received device ID from each of the connected peripheral devices as the at least one authorized device ID in response to receipt of the administrator input while each of the peripheral devices are connected to the hub.

17. The method of claim 11, wherein the authorizing step comprises:
comparing the device IDs of the one or more connected peripheral devices to the at least one authorized device ID to identify matches; and
authorizing each peripheral device connected to the hub for which a match is identified.

18. The method of claim 11, wherein the hub includes a communication path extending between each connected peripheral device and the communication cable and wherein the enabling step comprises:
selectively closing a switch within each communication path extending from the connected peripheral device such that communication between authorized connected peripheral devices and the communication cable is enabled and communication between connected peripheral devices that are not authorized and the communication cable are prevented.

19. A system for configuring a secure external hub for coupling a plurality of peripheral devices to a host computer, each peripheral device including device identification (ID), the system comprising:
means for designating at least one authorized device ID in response to an administrator input received via an administrator port of the hub;
means for authorizing one or more peripheral devices connected to the hub based on the designated at least one authorized device ID; and
means for enabling communication between authorized peripheral devices connected to the hub and a communication cable of the hub for communication with the host computer and preventing communication between unauthorized peripheral devices connected to the hub and the communication cable.

20. The system of claim 19, further comprising:
means for securely coupling the communication cable to a first port of the host computer.

* * * * *